United States Patent
Oostendorp

Patent Number: 5,493,783
Date of Patent: Feb. 27, 1996

[54] GRASS TRIMMING DEVICE

[76] Inventor: William E. Oostendorp, 3007 5th St. East, Brandenton, Fla. 34208

[21] Appl. No.: 247,654

[22] Filed: May 23, 1994

[51] Int. Cl.⁶ .................................................. A01D 50/00
[52] U.S. Cl. ................... 30/276; 30/287; 56/12.7
[58] Field of Search ................... 30/276, 286, 287; 56/12.1, 12.7, 239, 295

[56] References Cited

U.S. PATENT DOCUMENTS

| | | | |
|---|---|---|---|
| D. 242,894 | 1/1977 | Harris | 30/287 |
| 2,634,571 | 4/1953 | Lawrence | 56/12.7 |
| 2,850,862 | 9/1958 | Asbury | 56/295 |
| 3,062,299 | 11/1962 | Koepfinger | 30/287 |
| 3,555,680 | 1/1971 | Ford | 30/276 |
| 3,656,554 | 4/1972 | Buhner | 172/14 |
| 3,680,639 | 8/1972 | Davis | 172/15 |
| 3,747,213 | 7/1973 | Green et al. | 30/279 R |
| 3,814,189 | 6/1974 | Thompson | 172/13 |
| 3,815,234 | 6/1974 | Nelson | 30/276 |
| 3,905,103 | 9/1975 | Fort et al. | 30/276 |
| 3,918,241 | 11/1975 | Stillions | 56/12.7 |
| 3,923,102 | 12/1975 | Morris | 56/295 |
| 3,960,218 | 6/1976 | Atchley et al. | 172/13 |
| 4,022,283 | 5/1977 | Morgan | 172/15 |
| 4,260,026 | 4/1981 | Deckert | 172/25 |
| 4,357,752 | 11/1982 | Goodwin | 30/122 |
| 4,369,577 | 1/1983 | Gise | 56/12.7 |
| 4,479,302 | 10/1984 | Richter | 30/122 |
| 4,862,682 | 9/1989 | Wait et al. | 56/255 |

FOREIGN PATENT DOCUMENTS

| | | | |
|---|---|---|---|
| 30567 | 12/1909 | Sweden | 30/287 |

Primary Examiner—Kenneth E. Peterson
Assistant Examiner—Sean A. Pryor
Attorney, Agent, or Firm—Charles J. Prescott

[57] ABSTRACT

A grass trimming device for removal of grass which overgrows a concrete doughnut positioned on the ground surrounding a sprinkler head of an underground lawn sprinkler system. The device is connectable to a lawn trimmer having a rotating upright output shaft and includes a horizontal support member having a cylindrical strengthening and protecting ring which defines an outer circular perimeter of the device. The device also includes a plurality of freely rotatably mounted cutting blade members connected and downwardly extending from a lower surface of the support member by a threaded bolt, shaft or the like. Each blade member has an inverted L-shape with the horizontal leg thereof rotatably mounted by the bolt to the support member. The upright leg has a lower distal edge which is slightly larger than the doughnut and cooperates in grass cutting action with the lower distal ends of the blade mounting shafts to provide two separate circular cuts into grass grown over the doughnut, one cut being adjacent and slightly larger than the outer edge of the doughnut and the other being slightly larger than the central hole through the doughnut.

1 Claim, 2 Drawing Sheets

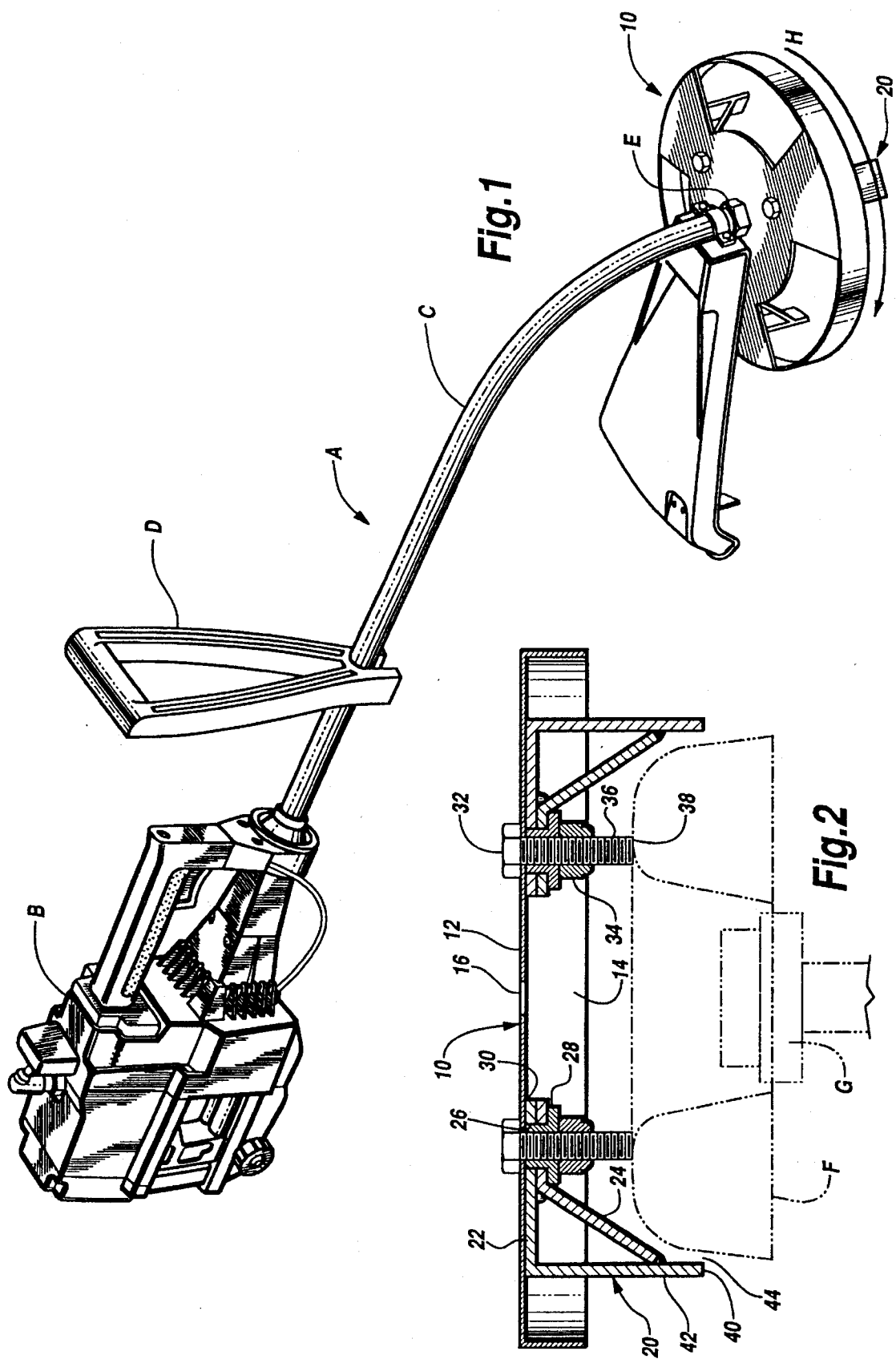

5,493,783

GRASS TRIMMING DEVICE

BACKGROUND OF THE INVENTION

1. Scope of Invention

This invention relates generally to lawn trimming devices, and more particularly to a grass trimming device connectable to the rotary output shaft of a lawn trimmer for removal of overgrown grass around a protective doughnut of an underground system sprinkler head.

2. Prior Art

Underground lawn sprinkler systems are well known and in wide use throughout the country. These systems include sprinkler heads mounted at or near grade level, some of which pop up when the sprinkler system is activated. However, when grass overgrows these sprinkler heads, sprinkling effectiveness is diminished or completely stifled.

Various lawn trimming devices, both manual and power activated, have been developed to trim the grass around the sprinkler heads. One such device is shown in U.S. Pat. No. 4,862,862 to Wait, et al. which discloses a rigid two-bladed cutting device connectable to the rotational output of a lawn trimmer also known as a "weed eater".

Another similarly activated device is shown in U.S. Pat. No. 4,357,752 invented by Goodwin which teaches a sprinkler head grass clipper having a generally cylindrical upright body for alignment over the sprinkler head to which is connected a plurality of outwardly extending cutting wires.

Richter, in U.S. Pat. No. 4,479,302 teaches a sprinkler head trimmer connectable to a conventional gasoline powered lawn edger which has an output shaft rotatable into an upright position to which is coupled a combination lawn edger and fixed blade sprinkler head trimmer.

Ford, in U.S. Pat. No. 3,555,680 teaches a manual sprinkler head trimmer connectable to a portable drill, this device teaching a series of three cylindrical concentric members each cooperatively functioning to trim the grass and dirt around a sprinkler head positioned below grade level.

In U.S. Pat. No. 3,747,213, a rotatably driven angular grass cutter for removal of grass and dirt around a sprinkler head is taught. This device is driven by an upright output shaft having fixed angular blades for cutting both soil and grass.

Various manual sprinkler head grass and lawn removers are shown in U.S. Pat. Nos. 4,260,026 to Deckert, in U.S. Pat. No. 4,022,283 to Morgan and in U.S. Pat. No. 3,960,218 to Atchley, et al. None of these above inventions are similar to that of the present invention except in a very general nature addressing removal of grass overgrown around a sprinkler head.

None of the prior art known to applicant teaches a sprinkler head trimming device having freely pivotable blades sized to fit around a protective doughnut placed around a sprinkler head and which trims overgrowth both around and within the circular central aperture of the doughnut in one easy step.

BRIEF SUMMARY OF THE INVENTION

This invention is directed to a grass trimming device for removal of grass which overgrows a concrete doughnut positioned on the ground surrounding a sprinkler head of an underground lawn sprinkler system. The device is connectable to a lawn trimmer having a rotating upright output shaft and includes a horizontal support member having a cylindrical strengthening and protecting ring which defines an outer circular perimeter of the device. The device also includes a plurality of freely rotatably mounted cutting blade members connected and downwardly extending from a lower surface of the support member by a threaded bolt or shaft. Each blade member has an inverted L-shape with the horizontal leg thereof rotatably mounted by the bolt to the support member. The upright leg has a lower distal edge which is slightly larger than the doughnut and cooperates in grass cutting action with the lower distal ends of the blade mounting shafts to provide two separate circular cuts into grass grown over the doughnut, one cut being adjacent and slightly larger than the outer edge of the doughnut and the other being slightly larger than the central hole through the doughnut.

It is therefore an object of this invention to provide a grass and lawn trimming device connectable to the rotating output shaft of a light duty lawn trimmer such as a "weedeater" which fully trims grass which has overgrown a protective doughnut surrounding a sprinkler head of an underground sprinkler system.

It is yet another object of this invention to provide a sprinkler head doughnut trimming device having freely rotatable blades which easily adjust to surround the doughnut and remove overgrowth without damage thereto and which deflect away from struck objects without danger.

In accordance with these and other objects which will become apparent hereinafter, the instant invention will now be described with reference to the accompanying drawings.

BRIEF DESCRIPTION OF THE DRAWINGS

FIG. 1 is a perspective view of a conventional lawn trimmer or "weedeater"0 having the invention (10) connected to the rotatable output shaft thereof.

FIG. 2 is a section view in the direction of arrows 2—2 in FIG. 3.

DETAILED DESCRIPTION OF THE INVENTION

Figure 3:
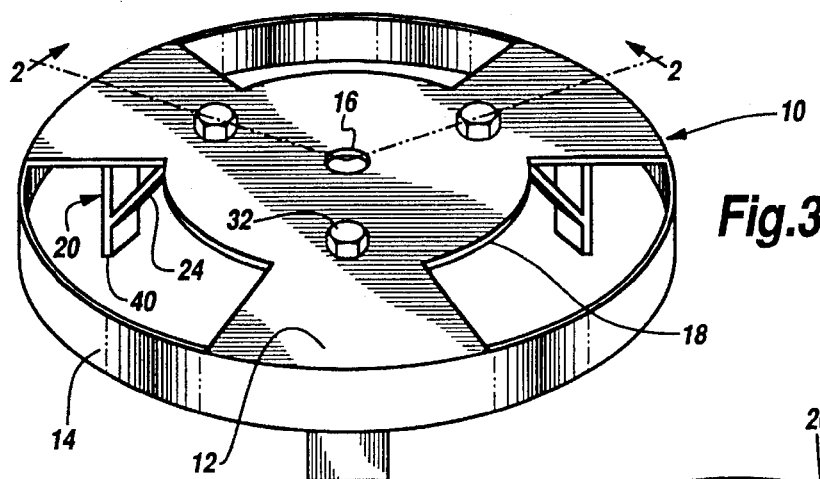
FIG. 3 is a perspective view from above of the invention as shown in FIG. 1.

Referring now to the drawings, the invention is generally shown at numeral 10 in all views. In FIG. 1, the invention 10 is shown connected to an upright output shaft E of a conventional lawn trimmer shown generally at numeral A. These lawn trimmers A in light-weight duty form known as "weedeaters", include an elongated shaft C having a power unit B such as a small gasoline engine connected at one end with a support handle D connected therealong. The device 10 described in more detail herebelow, rotates in the direction of arrow H on output shaft E.

The device 10, fabricated of relatively high grade steel material, includes a flat support member 12 having a circular perimeter and including a central mounting hole 16 formed therethrough. The support member 12 also includes three evenly spaced uniformly sized weight lightening apertures 18 to reduce unnecessary weight.

A cylindrical ring 14 is connected around the circular perimeter of the support member, including the apertures 18 so as to add strength and to provide an outer bumping and scuffing perimeter to fend the device 10 away from the user's feet and other fixed objects while in use.

The device 10 also includes three independently evenly spaced mounted blade members shown generally at numeral 20. Each of these blade members 20 includes a generally inverted L-shaped member having a horizontal leg 22 and an upright leg 42 formed of continuous flat stock steel material. A diagonal brace 24 welded to and extending diagonally between horizontal leg 22 and upright leg 42 as shown strengthens the orthogonal relationship therebetween and also is coextensive against the horizontal leg 22 in the region of cylindrical hole 26. A flanged bushing 28 is positioned within hole 26 through which is connected bolt 32 held in place on threaded shaft 36 by threaded lock nut 34.

Figure 4:
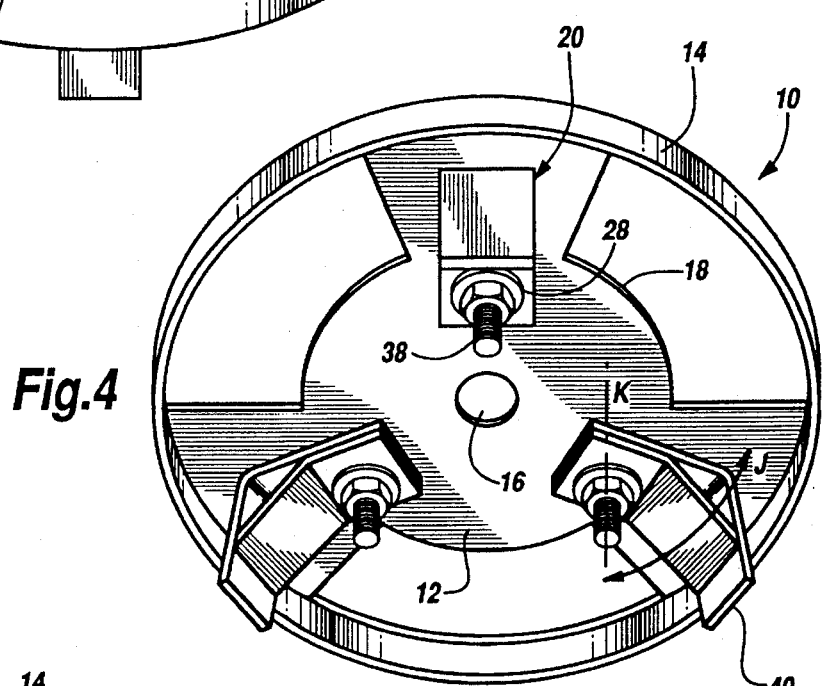
FIG. 4 is a perspective view from below of the invention as shown in FIG. 1.

To render the blade members 20 freely rotatable about bolt 32 and bushing 28, the overall length of the main cylindrical portion of bushing 28 is sized to be slightly longer than the overall length of hole 26, thus providing a gap 30 between the lower surface of support member 12 and the upper surface of horizontal leg 22 when nut 34 is fully tightened on threaded shaft 36 of bolt 32. Thus, each of the blade members 20 is freely rotatable about an imaginary axis K shown in FIG. 4 in the direction of arrow J.

Figure 5:
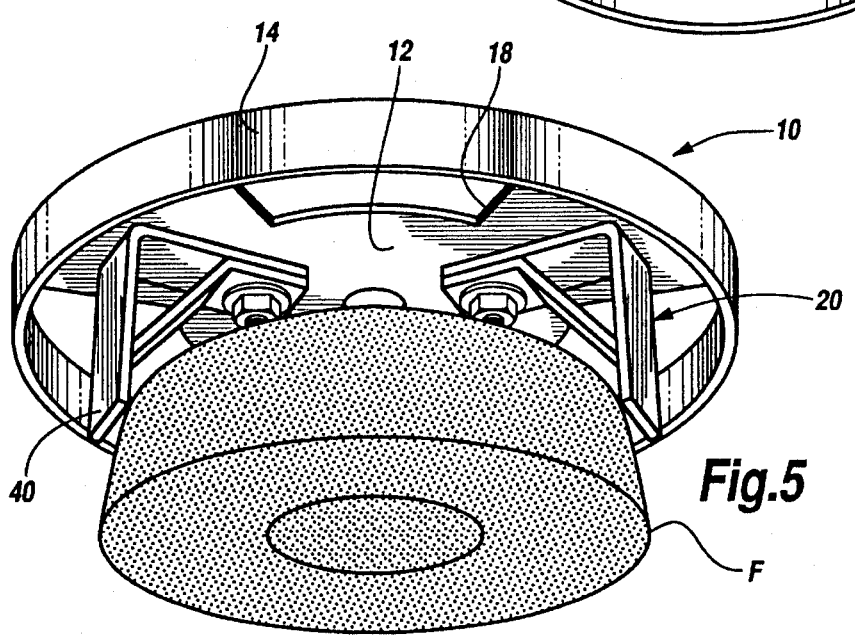
FIG. 5 is a perspective view similar to FIG. 4 showing the invention in position over a conventional concrete protective doughnut for sprinkler heads.

Referring particularly to FIGS. 2 and 5, the important grass and lawn trimming features of the present invention are there shown in relation to a conventional concrete doughnut F which is sized to fit around a conventional pop-up type sprinkler head G of an underground lawn sprinkling system (not shown).

The main cutting feature of the present invention is accomplished by the lower distal ends 40 of the upright legs 42 in combination with the leading upright edge of each upright leg 42 as the device 10 is rotated in the direction of arrow H in FIG. 1. The circular path cut by the lower distal edge 40 and the leading upright margin of upright leg 42 is sized to be slightly larger than the outer diameter of doughnut F so as to define a small gap 44 for clearance purposes and so as not to damage the doughnut F during trimming operations.

A second cutting path is defined in the preferred embodiment at 38, the common lower distal end of each of the threaded shafts 36. As the device is lowered down onto the doughnut F while in rotating movement, these threaded shafts 36 will contact the doughnut F at 38 so as to serve as both a stop for further downward movement and to also trim away any overgrowth from the central portion of the doughnut F and which emerges directly around the sprinkler head G.

By providing free rotation of each blade member 20 in the direction of arrow J about axis K, inadvertent impact with either the doughnut F or other ground-based objects by the rotating blade members 20 is inconsequential as the blade members 20 simply deflect laterally by free rotation about axis K and then to return by centrifical force back into an outer ready-for-cutting position. By adding diagonal member 24, additional strength is gained so that upright leg 42 does not flex in any manner outwardly due to centrifical force. By connecting diagonal member 24 directly to the mounting bolt 32 as described in FIG. 2, additional strength above and beyond the conventional weldments shown is achieved as well, better tying upright leg 42 directly to the horizontal leg 22.

It is noted that the invention as described does not include sharpened lower ends 40 or sharpened upright leading edges of the upright leg 42, although the sharpening of same would be within the scope of the present invention.

While the instant invention has been shown and described herein in what are conceived to be the most practical and preferred embodiments, it is recognized that departures may be made therefrom within the scope of the invention, which is therefore not to be limited to the details disclosed herein, but is to be afforded the full scope of the claims so as to embrace any and all equivalent apparatus and articles.

What is claimed is:

1. A grass trimming device for a lawn trimmer having a rotary output shaft, said device for trimming grass which grows over a doughnut positioned around a lawn sprinkler head, comprising:

a flat support member having a central means for connecting said support member to an output shaft of a lawn trimmer;

a cylindrical strengthening and impact ring connected to said support member perimeter;

a plurality of blade members each connected for free rotation about a blade mounting shaft downwardly extending orthogonally from said support member about a blade mounting circle concentric with an upright axis of rotation of said support member;

each said blade member having a horizontal and an upright leg which downwardly depends from a radially outwardly end of said horizontal leg;

each said horizontal leg having a mounting hole therethrough positioned nearer to a radially inner end of said horizontal leg for receiving said blade mounting shaft;

each said blade member also including a diagonally disposed brace member extending generally between a point just above a lower distal end of said upright leg and said mounting hole in said horizontal leg;

each said lower distal end of each said upright leg defining a grass cutting circle slightly larger in diameter than that of the doughnut and smaller in diameter than that of said cylindrical ring.

* * * * *